(12) United States Patent
Soto

(10) Patent No.: US 11,849,831 B2
(45) Date of Patent: Dec. 26, 2023

(54) TETHERED PHONE CASE AND HOLDER ASSEMBLY

(71) Applicant: Daniel Soto, Phoenix, AZ (US)

(72) Inventor: Daniel Soto, Phoenix, AZ (US)

(*) Notice: Subject to any disclaimer, the term of this patent is extended or adjusted under 35 U.S.C. 154(b) by 327 days.

(21) Appl. No.: 17/172,855

(22) Filed: Feb. 10, 2021

(65) Prior Publication Data

US 2022/0248834 A1    Aug. 11, 2022

(51) Int. Cl.
| | | |
|---|---|---|
| *A45F 5/00* | (2006.01) | |
| *A45C 11/00* | (2006.01) | |
| *H04B 1/3827* | (2015.01) | |
| *H04B 1/3888* | (2015.01) | |

(52) U.S. Cl.
CPC ............. *A45F 5/004* (2013.01); *A45C 11/00* (2013.01); *H04B 1/385* (2013.01); *H04B 1/3888* (2013.01); *A45C 2011/002* (2013.01); *A45F 2200/0516* (2013.01); *H04B 2001/3855* (2013.01)

(58) Field of Classification Search
CPC .. A45F 5/004; A45F 2200/0516; A45F 5/021; A45F 2005/008; A45C 11/00; A45C 2011/002; H04B 1/385; H04B 1/3888; H04B 2001/3855; H04B 1/3877; H04M 1/04; Y10S 224/09
See application file for complete search history.

(56) References Cited

U.S. PATENT DOCUMENTS

| | | | |
|---|---|---|---|
| 6,568,576 B1 | 5/2003 | Godshaw | |
| 6,662,986 B2 | 12/2003 | Lehtonen | |
| 9,314,078 B1 | 4/2016 | Haymond | |
| D829,202 S | 9/2018 | Ma | |
| 11,026,502 B1* | 6/2021 | Erold | ...................... A45F 5/004 |
| 2012/0021810 A1 | 1/2012 | Terry | |
| 2013/0190053 A1 | 7/2013 | Kelly | |
| 2014/0175135 A1* | 6/2014 | Paugh | .................. H04B 1/3877 |
| | | | 224/665 |
| 2014/0261541 A1 | 9/2014 | Lawler | |
| 2014/0353201 A1* | 12/2014 | Molineux | ............. F16L 55/105 |
| | | | 206/524.3 |
| 2015/0237992 A1* | 8/2015 | Kinskey | .................. A45F 3/005 |
| | | | 224/681 |
| 2017/0262027 A1* | 9/2017 | Farington | ............. G11C 16/04 |
| 2020/0274572 A1* | 8/2020 | Montgomery | ......... A41D 1/002 |

FOREIGN PATENT DOCUMENTS

EP     1300959     9/2002

* cited by examiner

*Primary Examiner* — Nguyen T Vo

(57) ABSTRACT

A tethered phone case and holder assembly for convenient carrying and damage prevention includes a pouch apparatus, a case apparatus, and a tether apparatus. The pouch apparatus comprises a pouch body defining a pouch interior and a clip coupled to a pouch back side to selectively engage a user's belt or waistline. The case apparatus comprises a case body defining a case interior. The case body is selectively engageable within the pouch interior. The case interior selectively receives a smartphone. A cable attachment is coupled to the case body. The tether apparatus comprises a cable compartment coupled to the pouch body. A tether cable is coupled to a cable spool within the cable compartment and extends out to couple with the cable attachment of the case apparatus.

10 Claims, 7 Drawing Sheets

TETHERED PHONE CASE AND HOLDER ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to phone protection devices more particularly pertains to a new phone protection device for convenient carrying and damage prevention. The present invention includes a case apparatus, a pouch apparatus, and a tether apparatus extending therebetween. The case apparatus is selectively engageable within the pouch apparatus.

(2) Description of Related Art Including Information Disclosed Under 37 CFR 1.97 and 1.98

The prior art relates to phone protection devices. Known devices include protective cases with a leash or strap, as well as carrying pouches. These devices, however, lack a protective case that is selectively engageable within a carrying pouch. These devices also lack a retractable tether joining a protective case with a carrying pouch.

BRIEF SUMMARY OF THE INVENTION

An embodiment of the disclosure meets the needs presented above by generally comprising a pouch apparatus, a case apparatus, and a tether apparatus. The pouch apparatus comprises a pouch body having a pouch top side, a pouch bottom side, a pouch left side, a pouch right side, a pouch back side, and an open pouch front side defining a pouch interior. A clip is coupled to the pouch back side and is configured to selectively engage a user's belt or waistline. The case apparatus comprises a case body having a case top side, a case bottom side, a case left side, a case right side, a case back side, and an open case front side defining a case interior. The case body is selectively engageable within the pouch interior. The case interior is configured to selectively receive a smartphone. The case body has a plurality of function apertures extending therethrough and configured to allow for functionality of the smartphone. A cable attachment is coupled to the case body. The tether apparatus comprises a cable compartment coupled to the pouch body. The cable compartment is coupled to the pouch back side. A cable spool is coupled within the cable compartment. A tether cable is coupled to the cable spool. The tether cable extends out of the cable compartment and is coupled to the cable attachment of the case apparatus.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
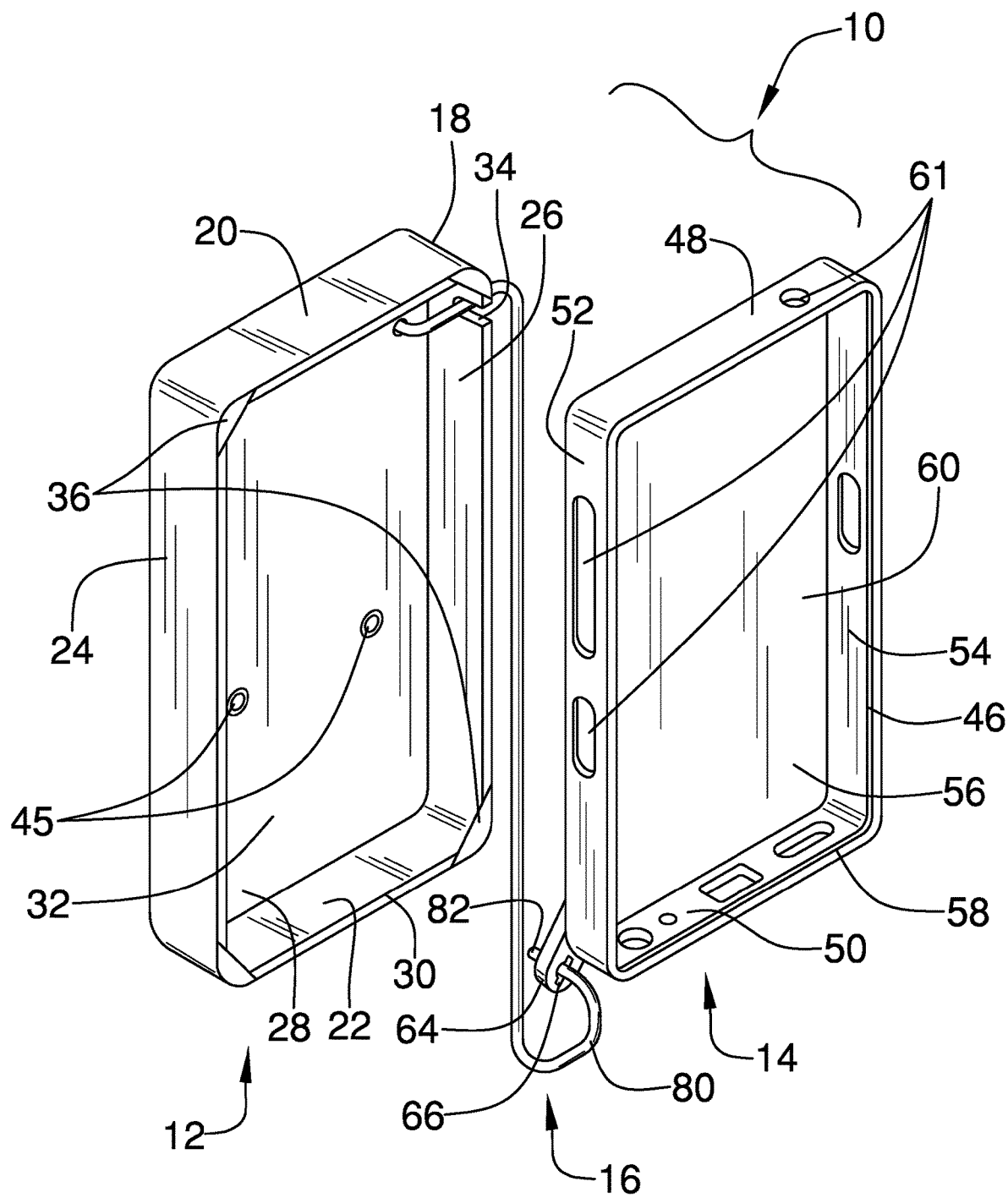
FIG. 1 is an isometric view of a tethered phone case and holder assembly according to an embodiment of the disclosure.

With reference now to the drawings, and in particular to FIGS. 1 through 8 thereof, a new phone protection device embodying the principles and concepts of an embodiment of the disclosure and generally designated by the reference numeral 10 will be described.

As best illustrated in FIGS. 1 through 8, the tethered phone case and holder assembly 10 generally comprises a pouch apparatus 12, a case apparatus 14, and a tether apparatus 16. A pouch body 18 has a pouch top side 20, a pouch bottom side 22, a pouch left side 24, a pouch right side 26, a pouch back side 28, and an open pouch front side 30 defining a pouch interior 32. The pouch right side 26 may have a cable slot 34 extending from the open pouch front side 30. A plurality of corner catches 36 may be coupled to the pouch body 18. The plurality of corner catches 36 is coupled to each corner of the open pouch front side 30. The ouch body 18 may have rounded edges for user comfort.

A clip 38 is coupled to the pouch body 18. The clip 38 is coupled to the pouch back side 28 and is configured to selectively engage a user's belt 40 or waistline. The clip 38 has an attachment portion 42 coupled to the pouch back side 28 and a curved clip portion 44 coupled to the attachment portion 42. The attachment portion 42 may have a pair of rivets 45 extending through the pouch back side 28. The clip portion 44 is elastically flexible to securely attach to the user's belt 40.

Figure 2:
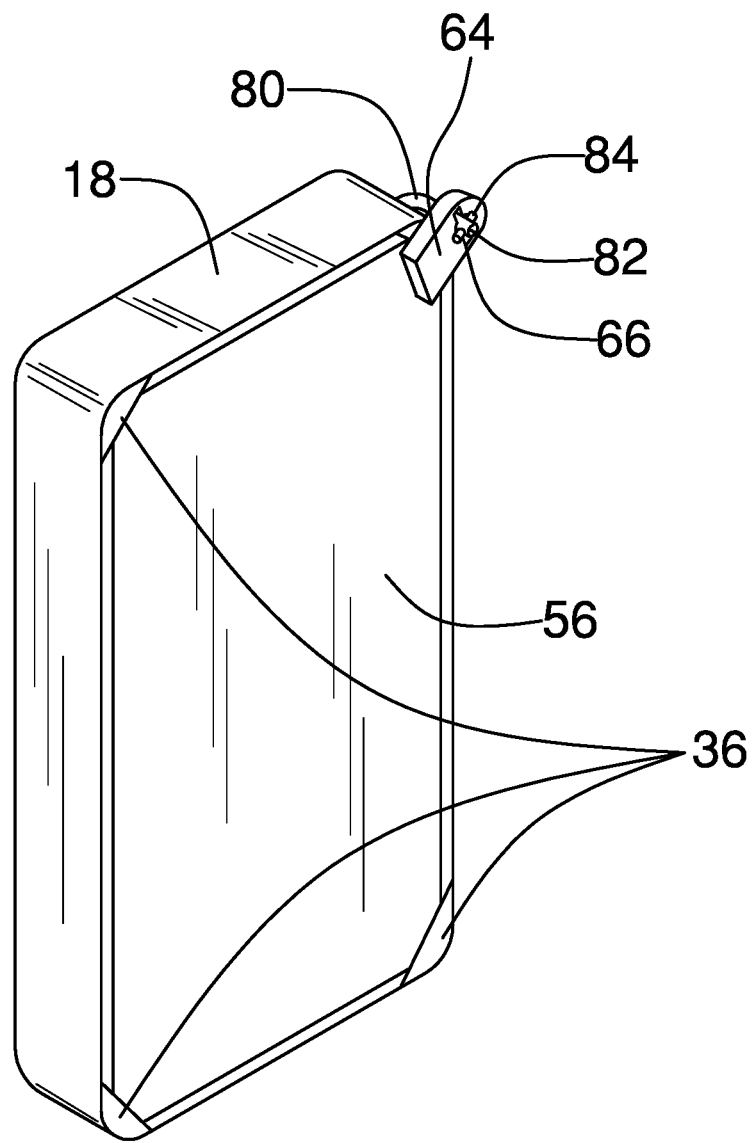
FIG. 2 is an isometric view of an embodiment of the disclosure.
Figure 3:
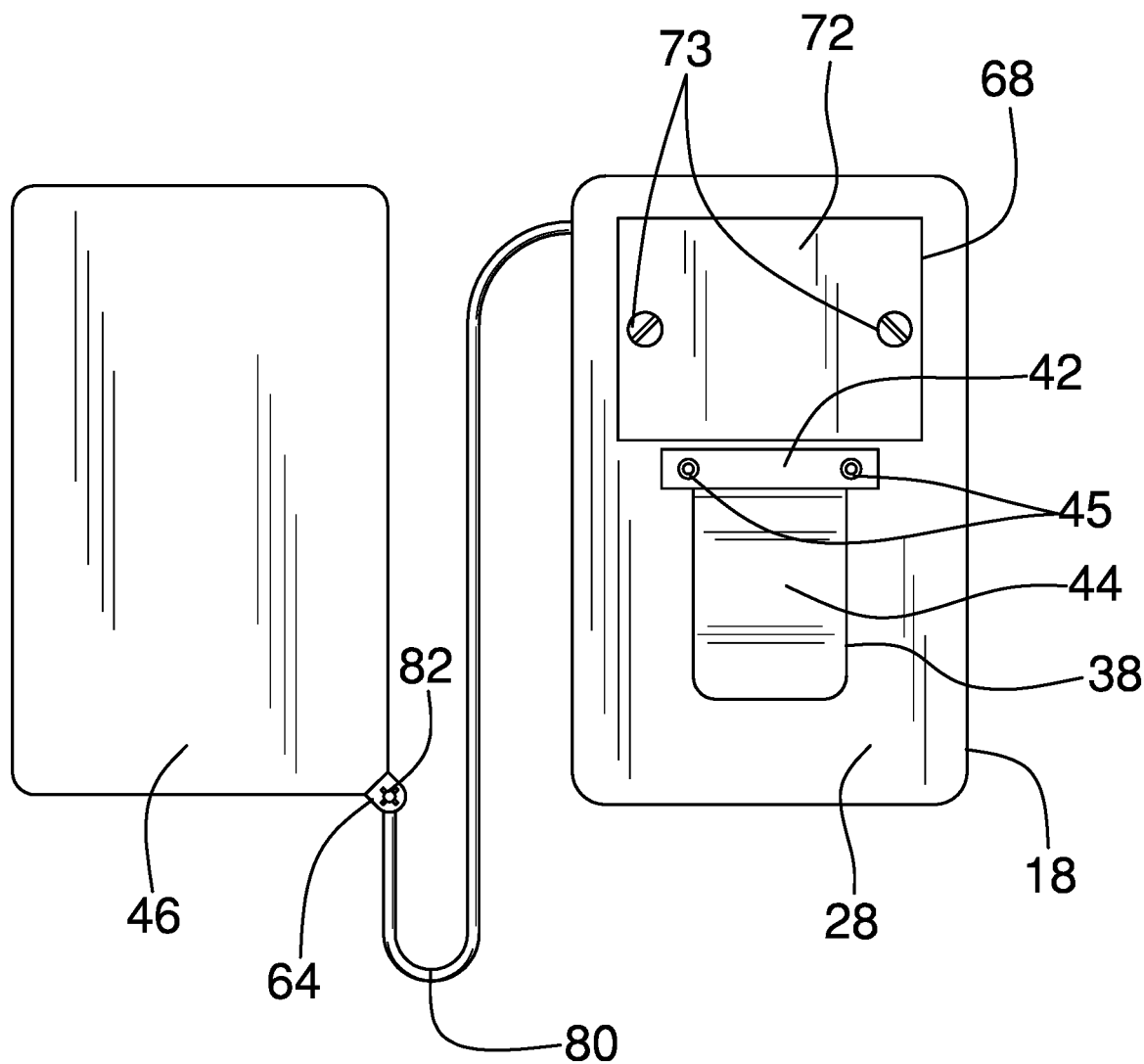
FIG. 3 is a rear elevation view of an embodiment of the disclosure.
Figure 4:
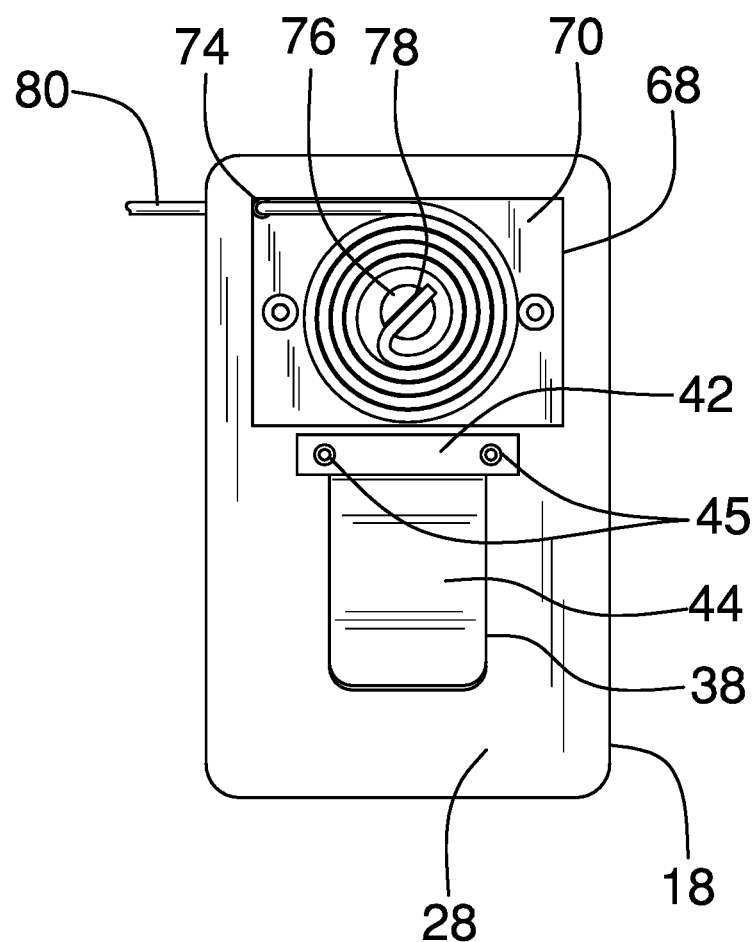
FIG. 4 is a cross-sectional view of an embodiment of the disclosure.
Figure 5:
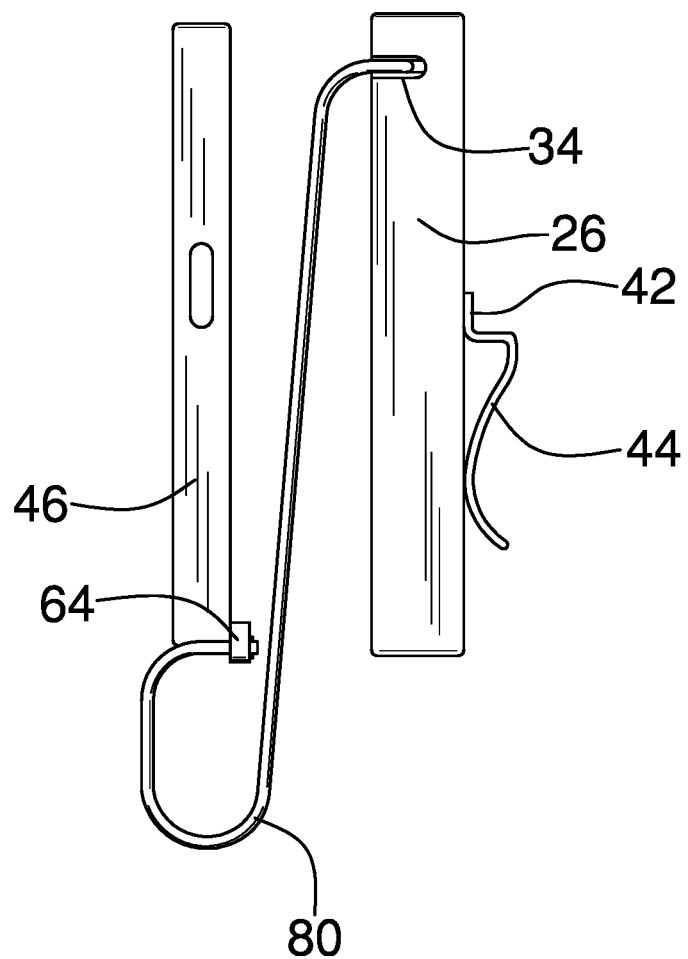
FIG. 5 is a side elevation view of an embodiment of the disclosure.
Figure 6:
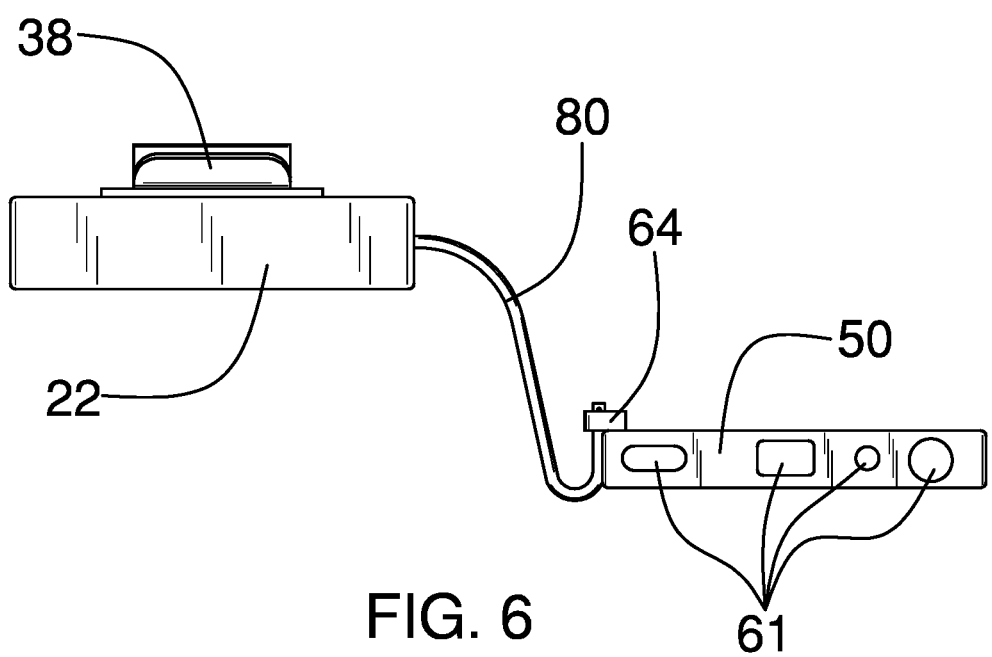
FIG. 6 is a bottom plan view of an embodiment of the disclosure.
Figure 7:
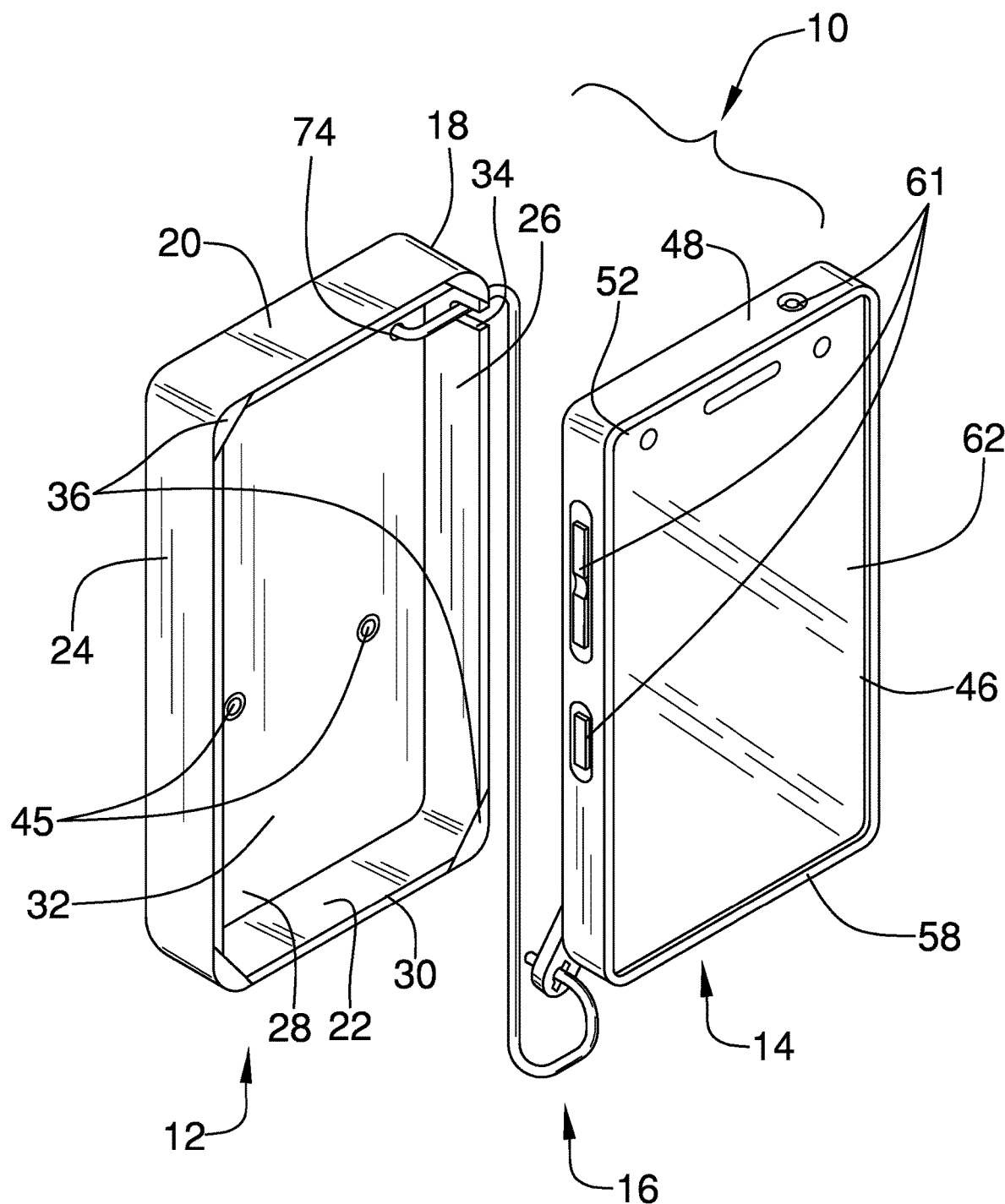
FIG. 7 is an isometric view of an embodiment of the disclosure.
Figure 8:
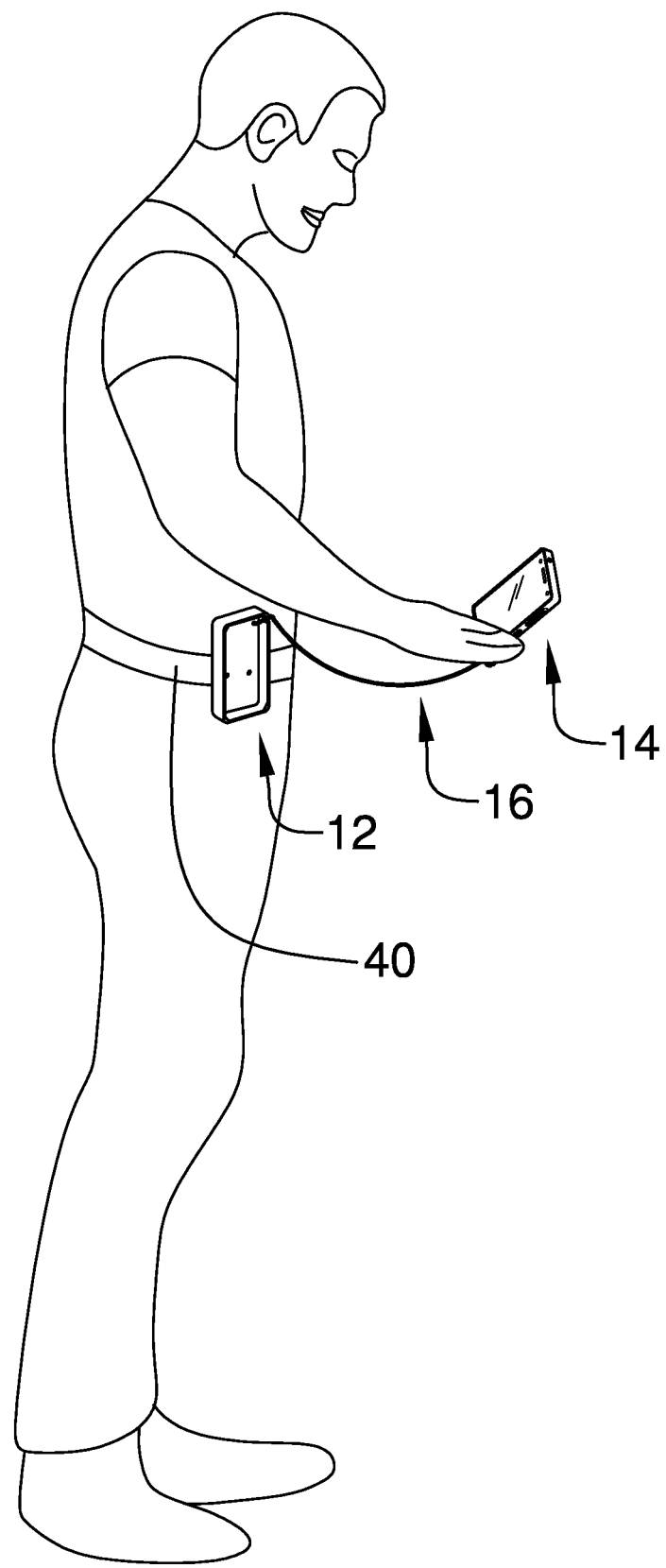
FIG. 8 is an in-use view of an embodiment of the disclosure.

The case apparatus 14 comprises a case body 46 having a case top side 48, a case bottom side 50, a case left side 52, a case right side 54, a case back side 56, and an open case front side 58 defining a case interior 60. The case body 46 is selectively engageable within the pouch interior 32. The case back side 56 may be secured by the plurality of corner catches 36 and rests flush with the open pouch front side 30 when the case body 46 is engaged within the pouch interior 32 (as seen in FIG. 2). The case interior 60 is configured to selectively receive a smartphone 62. The case body 46 has a plurality of function apertures 61 extending therethrough and configured to allow for functionality of the smartphone 62. The case body 46 may have rounded corners for user comfort and may be made of a resilient, shock-resistant material to protect the smartphone 62. A cable attachment 64 is coupled to the case body 46. The cable attachment 64 may be coupled to the case back side 56 and has a connect aperture 66 extending therethrough.

The tether apparatus 16 comprises a cable compartment 68 coupled to the pouch body 18. The cable compartment 68 has an inner compartment plate 70 coupled to the pouch back side 28 and an outer compartment plate 72 connected to the inner compartment plate 70 with a pair of screws 73. The outer compartment plate 72 may thus be easily disengaged for maintenance. The inner compartment plate 70 has a cable aperture 74 extending through the pouch back side 28. A cable spool 76 is coupled within the cable compartment 68. The cable spool 76 may have a coil spring 78.

A tether cable 80 is coupled to the cable spool 76. The coil spring retractably winds the tether cable 80 around the cable spool 76. The tether cable 80 extends out of the cable compartment 68 through the cable aperture 74 and is coupled to the cable attachment 64 of the case apparatus. A cable distal end 82 of the tether cable is selectively engageable with the connect aperture 66. The cable distal end 82 may have a cross rod 84 to allow for engagement and disengagement with the cable attachment 64.

In use, the user separates the case apparatus 14 holding the smartphone 62 for normal use. When done, the tether cable 80 is wound around the cable spool 76 as the user moves the case apparatus 14 back towards the pouch apparatus 12. The case body 46 is engaged within the pouch interior 32 with the tether cable 80 resting within the cable slot 34.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A tethered phone case and holder assembly comprising:
   a pouch apparatus comprising:
      a pouch body having a pouch top side, a pouch bottom side, a pouch left side, a pouch right side, a pouch back side, and an open pouch front side defining a pouch interior;
      a clip coupled to the pouch body, the clip being coupled to the pouch back side and being configured to selectively engage a user's belt or waistline; and
      the pouch right side having a cable slot extending from the open pouch front side;
   a case apparatus comprising:
      a case body having a case top side, a case bottom side, a case left side, a case right side, a case back side, and an open case front side defining a case interior, the case body being selectively engageable within the pouch interior, the case interior being configured to selectively receive a smartphone, the case body having a plurality of function apertures extending therethrough and configured to allow for functionality of the smartphone; and
      a cable attachment coupled to the case body; and
   a tether apparatus comprising:
      a cable compartment coupled to the pouch body, the cable compartment being coupled to the pouch back side;
      a cable spool coupled within the cable compartment; and
      a tether cable coupled to the cable spool, the tether cable extending out of the cable compartment into the pouch interior, out through the cable slot and being coupled to the cable attachment of the case apparatus.

2. The tethered phone case and holder assembly of claim 1 further comprising the cable attachment being coupled to the case back side and having a connection aperture extending therethrough; a cable distal end of the tether cable being selectively engageable with the connection aperture.

3. The tethered phone case and holder assembly of claim 2 further comprising the cable distal end having a cross rod.

4. The tethered phone case and holder assembly of claim 1 further comprising the pouch apparatus including a plurality of corner catches coupled to the pouch body, the plurality of corner catches being coupled to each corner of the open pouch front side.

5. The tethered phone case and holder assembly of claim 4 further comprising the case back side being secured by the plurality of corner catches and resting flush with the open pouch front side when the case body is engaged within the pouch interior.

6. The tethered phone case and holder assembly of claim 1 further comprising the clip having an attachment portion coupled to the pouch back side and a curved clip portion coupled to the attachment portion, the clip portion being elastically flexible to securely attach to the user's belt.

7. The tethered phone case and holder assembly of claim 6 further comprising the attachment portion having a pair of rivets extending through the pouch back side.

8. The tethered phone case and holder assembly of claim 1 further comprising the cable compartment having an inner compartment plate and an outer compartment plate connected with a pair of screws, the inner compartment plate having a cable aperture extending through the pouch back side.

9. The tethered phone case and holder assembly of claim 1 further comprising the cable spool having a coil spring to retractably wind the tether cable around the cable spool.

10. A tethered phone case and holder assembly comprising:
    a pouch apparatus comprising:
        a pouch body having a pouch top side, a pouch bottom side, a pouch left side, a pouch right side, a pouch back side, and an open pouch front side defining a pouch interior, the pouch right side having a cable slot extending from the open pouch front side; and
        a plurality of corner catches coupled to the pouch body, the plurality of corner catches being coupled to each corner of the open pouch front side;
    a clip coupled to the pouch body, the clip being coupled to the pouch back side and being configured to selectively engage a user's belt or waistline, the clip having an attachment portion coupled to the pouch back side and a curved clip portion coupled to the attachment portion, the attachment portion having a pair of rivets extending through the pouch back side, the clip portion being elastically flexible to securely attach to the user's belt;
    a case apparatus comprising:
        a case body having a case top side, a case bottom side, a case left side, a case right side, a case back side, and an open case front side defining a case interior, the case body being selectively engageable within the pouch interior, the case back side being secured by the plurality of corner catches and resting flush with the open pouch front side when the case body is engaged within the pouch interior, the case interior being configured to selectively receive a smartphone, the case body having a plurality of function apertures extending therethrough and configured to allow for functionality of the smartphone; and
        a cable attachment coupled to the case body, the cable attachment being coupled to the case back side and having a connection aperture extending therethrough; and
    a tether apparatus comprising:
        a cable compartment coupled to the pouch body, the cable compartment having an inner compartment plate coupled to the pouch back side and an outer compartment plate connected to the inner compartment plate with a pair of screws, the inner compartment plate having a cable aperture extending through the pouch back side;
        a cable spool coupled within the cable compartment, the cable spool having a coil spring; and
        a tether cable coupled to the cable spool, the coil spring retractably winding the tether cable around the cable spool, the tether cable extending out of the cable compartment into the pouch interior, out through the cable slot and being coupled to the cable attachment of the case apparatus, a cable distal end of the tether cable being selectively engageable with the connection aperture, the cable distal end having a cross rod.

* * * * *